United States Patent [19]

Naka et al.

[11] Patent Number: 5,389,991
[45] Date of Patent: Feb. 14, 1995

[54] CAMERA HAVING DATA RECORDING DEVICE

[75] Inventors: Yoji Naka, Tokyo; Kazuhiko Onda, Saitama; Michihiro Shiina, Saitama, all of Japan

[73] Assignee: Fuji Photo Film Co., Ltd., Kanagawa, Japan

[21] Appl. No.: 22,952

[22] Filed: Feb. 25, 1993

[30] Foreign Application Priority Data

Feb. 25, 1992 [JP] Japan .................................. 4-073440
Feb. 25, 1992 [JP] Japan .................................. 4-073441
Mar. 30, 1992 [JP] Japan .................................. 4-074479

[51] Int. Cl.⁶ .................... G03B 17/02; G03B 37/00
[52] U.S. Cl. .................................. 354/159; 354/94
[58] Field of Search ............... 354/159, 106, 105, 94

[56] References Cited

U.S. PATENT DOCUMENTS

| | | | |
|---|---|---|---|
| 4,583,831 | 4/1986 | Harvey | 354/106 |
| 4,860,039 | 8/1989 | Hata et al. | 354/106 |
| 4,926,203 | 5/1990 | Hata et al. | 354/287 |
| 5,086,311 | 2/1992 | Naka et al. | 354/195.1 |
| 5,245,373 | 9/1993 | Ogawa et al. | 354/106 |

FOREIGN PATENT DOCUMENTS

| | | |
|---|---|---|
| 2708300 | 2/1977 | Germany . |
| 54-47630 | 4/1979 | Japan . |
| 54-47631 | 4/1979 | Japan . |
| 54-118825 | 9/1979 | Japan . |
| 0534803 | 2/1993 | Japan . |
| 5107631 | 4/1993 | Japan . |

Primary Examiner—Michael L. Gellner
Assistant Examiner—Nicholas J. Tuccillo
Attorney, Agent, or Firm—Young & Thompson

[57] ABSTRACT

A panoramic camera is provided with a masking mechanism. When the panoramic size is designated, the masking mechanism partially masks an exposure aperture that otherwise would create a full size picture, thereby to form a panoramic picture. On a rear door of the camera are mounted first and second data recorders. When the full size is designated, the first data recorder records numerical data on the first picture and in a larger size. When the panoramic size is designated, the second data recorder records numerical data on the second picture and in a smaller size. The full-size data are positioned outside the area of the panoramic picture.

9 Claims, 17 Drawing Sheets

CAMERA HAVING DATA RECORDING DEVICE

BACKGROUND OF THE INVENTION

1. Field of the Invention

The present invention relates to a camera having a data recording device for recording data on a picture including the date or time of photography, and the shutter speed. More particularly, the present invention relates to a data recording device in which the size and position of the recorded data are changeable according to the size of the picture.

2. Description of the Prior Art

There is a panoramic camera commercially available and widely in use. In this camera, as disclosed in U.S. Pat. No. 5,086,311, photographs can be taken on a photographic film as picture frames of a standard full size (36×24 ram), or a panoramic size (36×13 mm) narrowed vertically by masking an exposure aperture of full size. To print a panoramic picture, the enlargement is substantially twice that for a picture of full size.

There is also a camera widely in use, which incorporates a data recording device for recording on a picture photographic information including the date or time of photography. This is desirable because one can see, on the finished photograph, not only an image but also information relating to the image.

However, there is a problem in the conventional data recording device, for the photographic information is recorded at a position beyond what can be printed for panoramic pictures. Such a data recording device cannot cause the photographic information to appear on a panoramic photoprint.

OBJECTS OF THE INVENTION

In view of the foregoing problems, an object of the present invention is to provide a camera in which photographic information can be recorded on a picture of panoramic size.

Another object of the present invention is to provide a camera in which information as to a panoramic picture can be recorded at such a favorable size that the data reproduced on the photoprint are consonant with the overall size of the panoramic photoprint.

Still another object of the present invention is to provide a camera in which a full/panoramic-changeable construction can be combined with a data recording device with only a small number of parts, in a small space and at a low cost.

SUMMARY OF THE INVENTION

In order to achieve the above and other objects and advantages of this invention, size designating means designates one of at least first and second sizes in order to determine before effecting exposure a size to be printed photographically. A second size is smaller than a first size. A first area is to be used for photographic printing in accordance with a picture formed on photographic film while designating the first size. A second area is to be used for photographic printing at a large printing magnification in accordance with a picture as formed on the film while designating the second size. First data recording means records first data within the first area. Second data recording means records second data within the second area. The second data are smaller than the first data. Selector means selects one of the first and second data recording means in accordance with the designation of size by the size designating means.

In a preferred embodiment, when the first size is designated, a full size picture equal to the first area is formed on the film by causing to fall on the film light that has passed through an exposure aperture. When the second size is designated, a small size picture equal to the second area is formed on the film by partially masking the exposure aperture with masking means.

Photographic information can be recorded on a picture of the panoramic size. Information for the panoramic picture can be recorded at such a favorable size that the data reproduced on the photoprint are consonant with the overall size of panoramic photoprints. A full/panoramic-changeable construction can be combined with a data recording device having only a small number of parts, in a small space, and at a low cost.

BRIEF DESCRIPTION OF THE DRAWINGS

The above and other objects and advantages of the present invention will become more apparent from the following detailed description when used in connection with the accompanying drawings, in which:

FIG. 14 illustrates the full size position, and FIG. 15 illustrates the panoramic position;

DETAILED DESCRIPTION OF THE PREFERRED EMBODIMENTS

Figure 1:
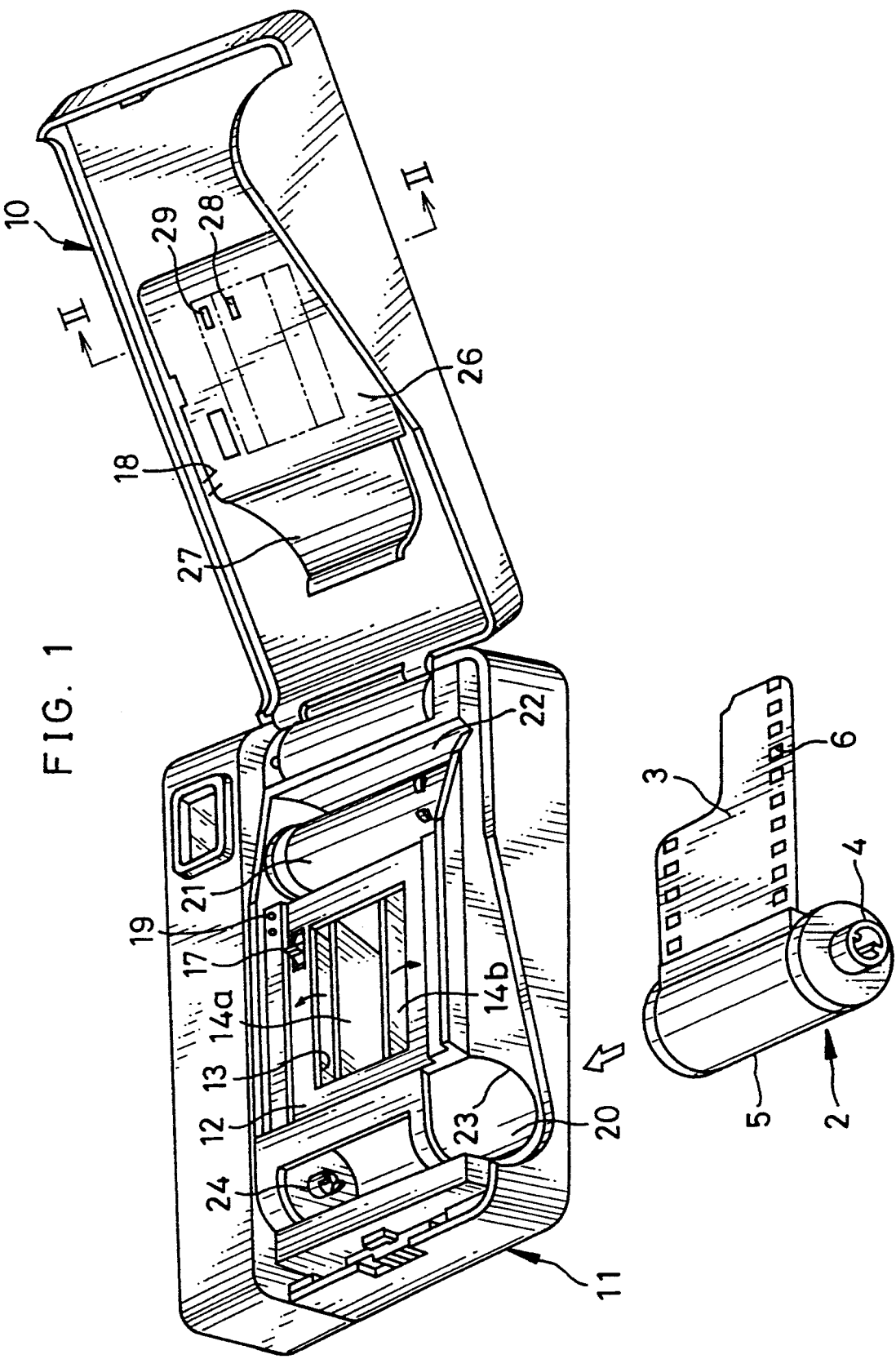
FIG. 1 is an exploded perspective view illustrating a panoramic camera of the present invention, with the rear door open, and the photographic film in a position to be inserted.

FIG. 1 illustrates a novel data-recording camera and a photographic film cassette used therein. The cassette 2 has photographic film 3, a spool 4 on which the film 3 is wound in the form of a roll, and a cassette shell 5 containing the film 3 in light-tight fashion. The film 3 is provided with two series of perforations 6 along both edges, as is well known in the field of photography.

Figure 4:
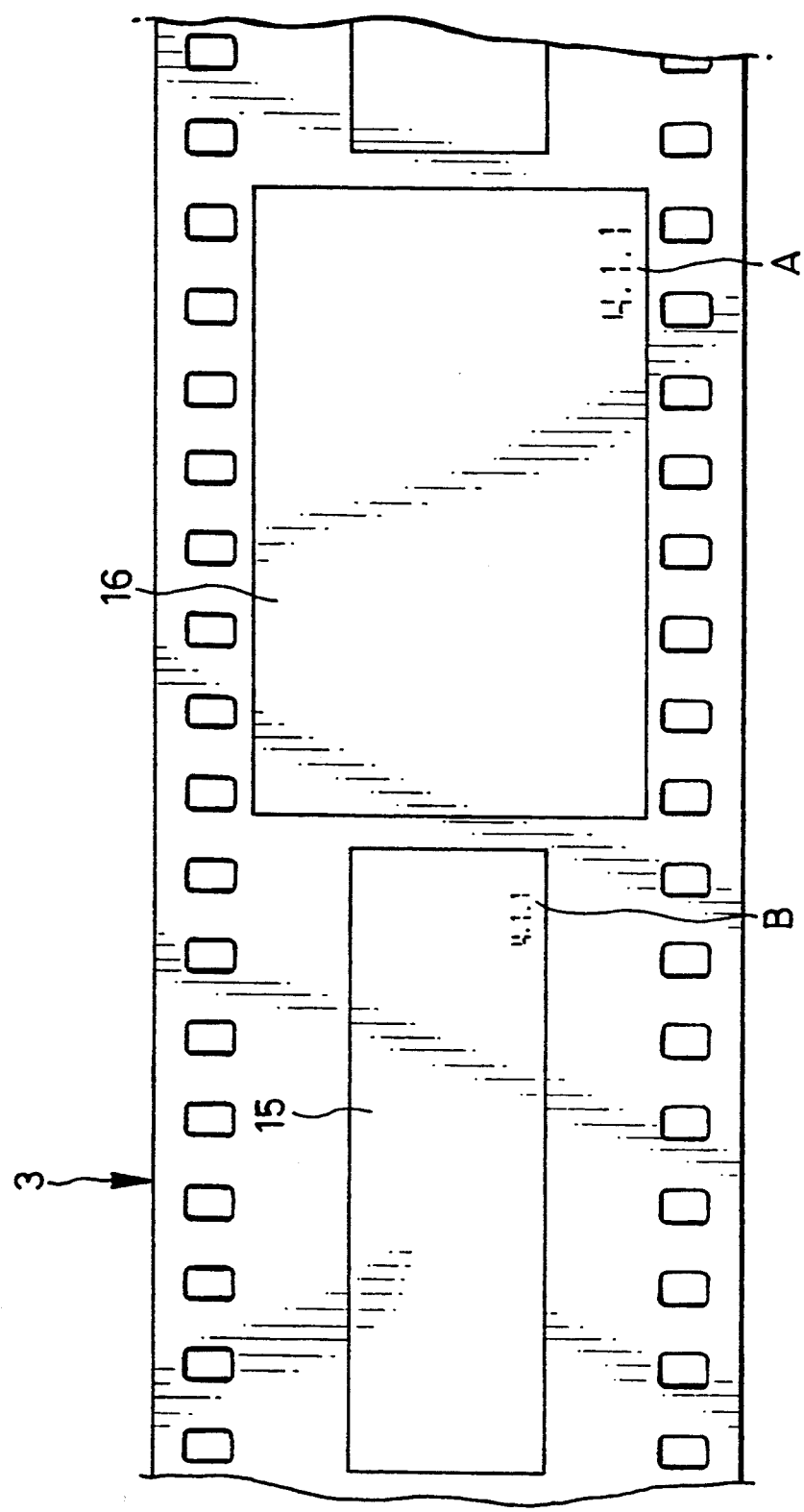
FIG. 4 is a fragmentary view illustrating the film used in the novel camera.

When the rear door 10 of camera body 11 is open, there appears an exposure tunnel 12 at the center of the camera body 11. The rear of the exposure tunnel 12 has an exposure aperture 13. Inside the exposure tunnel 12 are arranged a pair of opaque masking plates 14a and 14b, which are mounted in a swingable manner and adjust the vertical range over which the exposure aperture 13 can open. When the masking plates 14a and 14b partly mask the exposure aperture 13 by intercepting light, the camera is caused to create a vertically narrowed picture 15 of a panoramic size on the film 3, as illustrated in FIG. 4. When the masking plates 14a and 14b retreat outside the vertical extent of the exposure aperture 13, the camera is caused to create a picture 16 of a full size on the film 3.

Over the exposure aperture 13, there are arranged a sprocket 17 to be engaged with the perforations 6, and terminals 19 to be in contact with terminals 18 on the rear door 10. On opposite sides of the exposure aperture 13 are arranged a cassette chamber 20 for containing the cassette 2 and a film take-up chamber 22 having a film take-up spool 21. The cassette chamber 20 has a bottom opening 23, through which the cassette 2 is inserted. There is arranged a fork 24 on the upper face inside the cassette chamber 20, for rotating the spool 4.

On the inside of the rear door 10, there is mounted a film pressure plate 26 provided with a film guide 27. The pressure plate 26, when the film 3 is positioned over the exposure aperture 13, presses the film 3 against the exposure aperture 13. The film guide 27 directs the film 3 to the take-up spool 21 so as to wind the film 3 on to the take-up spool 21 with ease. In the pressure plate 26 are formed two openings 28 and 29, through which the film 3 is exposed by the light representing information, later to be described in detail. The positions of the openings 28 and 29 are determined according to edges of the respective pictures 15 and 16, which are correspondingly indicated by phantom lines in FIG. 1.

Figure 2:
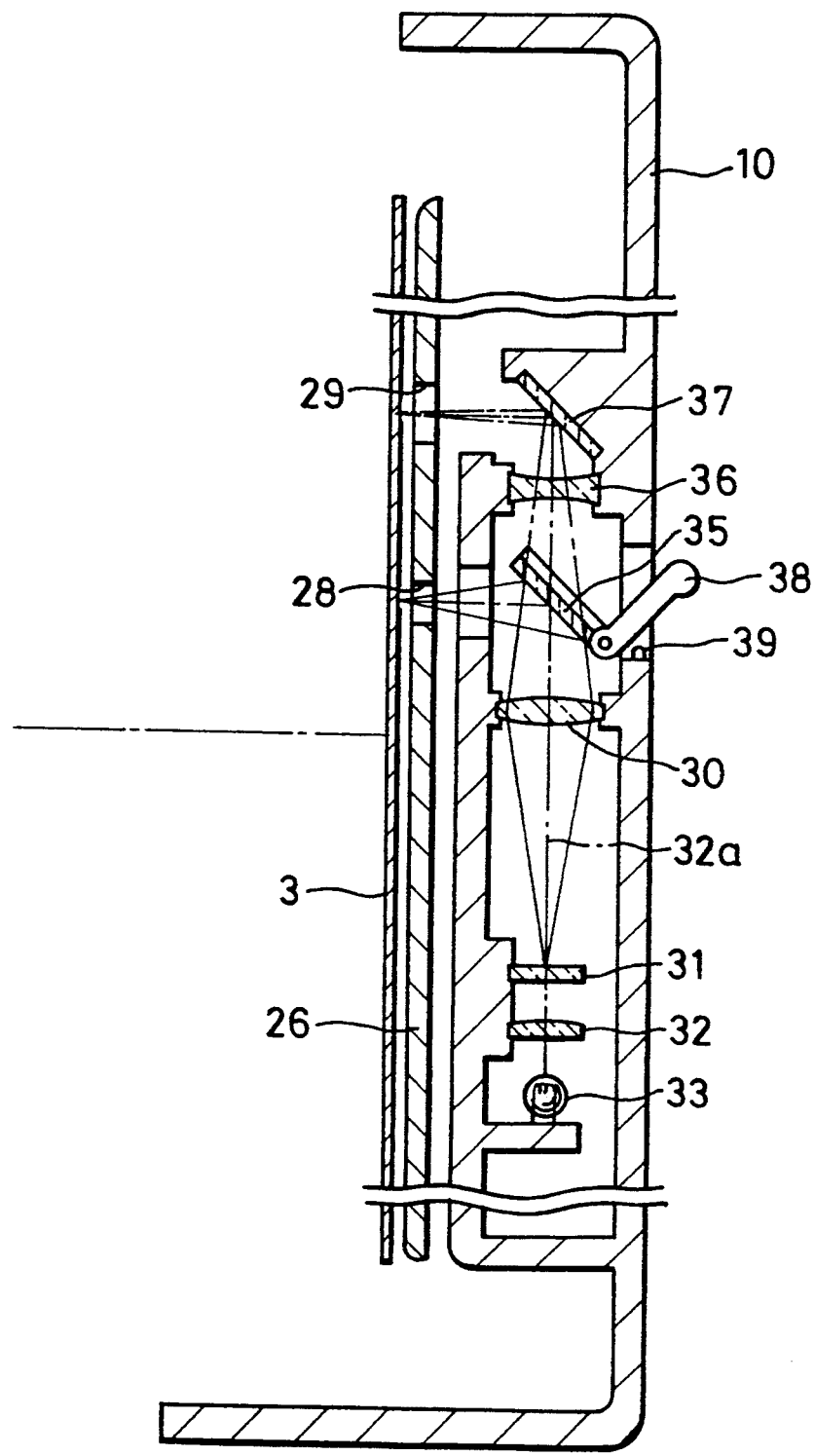
FIG. 2 is a cross section, taken on line A—A in FIG. 1, illustrating a date recording device.

FIG. 2 illustrates a device for recording dates on the film. The rear door 10 incorporates a convex lens 30 so arranged that its optical axis 32a is parallel to the pressure plate 26. Along this optical axis 32a are arranged a liquid crystal display panel (LCD) 31, a condenser lens 32, a light source or lamp 33. The LCD 31 and the lamp 33 are driven by a data recording control circuit 45 (see FIG. 3). Over the convex lens 30 are arranged a movable mirror 35, a concave lens 36, and a stationary mirror 37. Instead of using the lamp 33 in the present date recording device, a light-emitting diode (LED) may be used as a light source. The movable and stationary mirrors 35 and 37 may alternatively be prisms as reflective surfaces.

The movable mirror 35 is fixed to a changeover lever 38 which is swingable and externally operable. The movable mirror 35 is movable between positions wherein it intercepts or not the optical axis 32a of the convex lens 30. When intercepting the optical axis 32a, the movable mirror 35 reflects the light from the lamp 33 so as to project it through the opening 28 onto the film 3 with the light focussed on the film 3. When the movable mirror 35 is retracted from the optical axis 32a, the light from the lamp 33 falls on the concave lens 36, and is reflected by the stationary mirror 37 through the opening 29 onto the film 3, again focussed on the film 3. The changeover lever 38 is provided with an overcenter toggle spring (not shown), in order to locate the mirror 35 stably in either extreme position intercepting or not the optical axis 32a. The reference numeral 39 designates a switch for detecting the position of the changeover lever 38. When the movable mirror 35 intercepts the optical axis 32a, the switch 39 is not actuated, as shown in FIG. 2. When movable mirror 35 is withdrawn from the optical axis 32a, the switch 39 is depressed.

Figure 3:
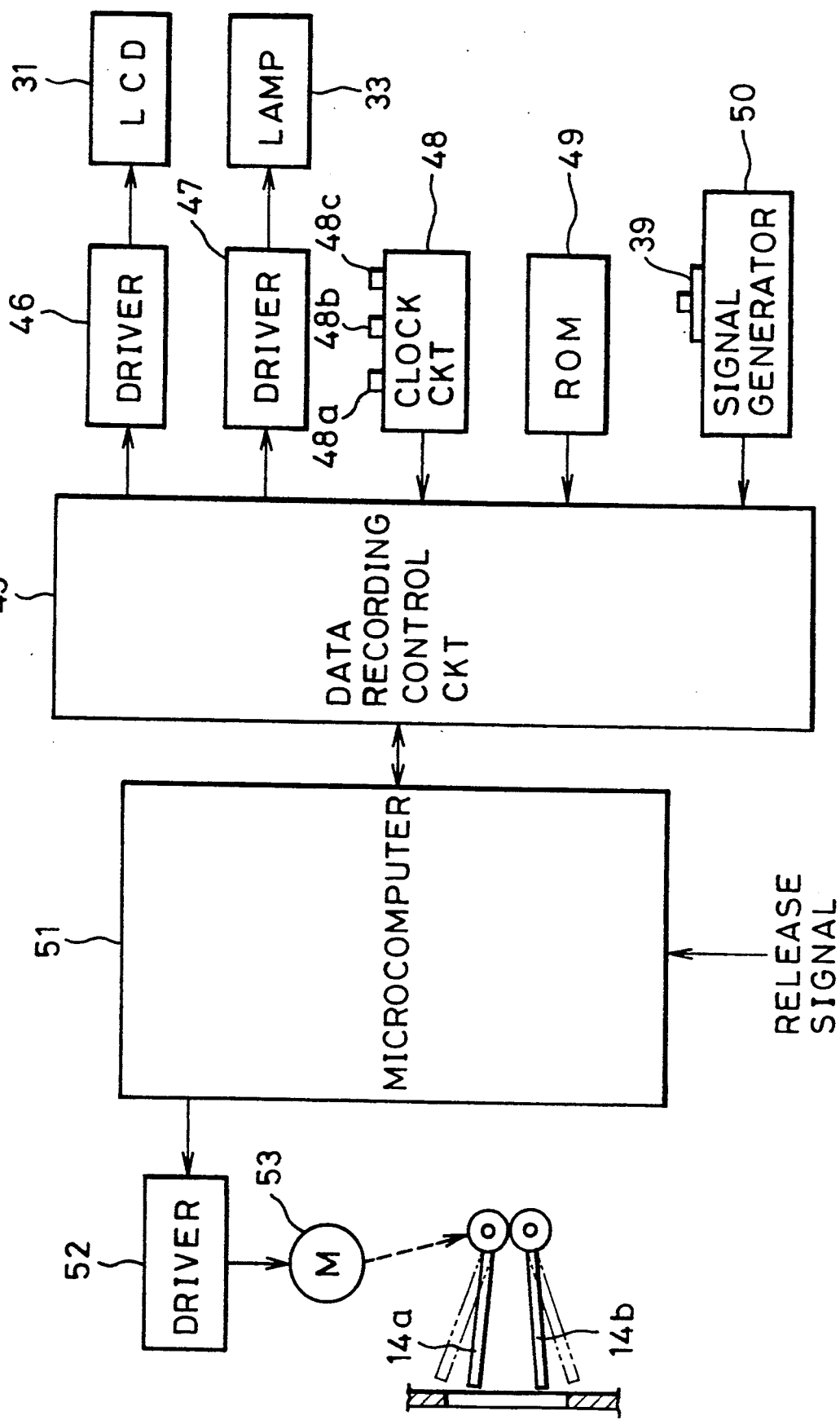
FIG. 3 is a schematic diagram illustrating an arrangement of relevant circuits of the novel camera.

FIG. 3 illustrates the arrangement of the relevant circuits for embodying the present invention. The data recording control circuit 45 controls the LCD 31 and the lamp 33 through respective drivers 46 and 47. The control circuit 45 is connected to it clock circuit 48, a ROM 49 and a signal generator 50 actuated by the switch 39. The clock circuit 48 calculates and outputs information to be displayed on the LCD 31 in a pattern of opaque and transparent segments, so as to represent the date constituted by a year, month and day. The dock circuit 48 has a construction such that the date is manually settable through operable buttons 48a to 48c, but may automatically calculate the present date. The ROM 49 stores a program for controlling the period of actuating the lamp 33 in order to maintain constant the amount of light for recording the date. When the rear door 10 is closed, the control circuit 45 is connected via the terminals 18 and 19 to a microcomputer 51 incorporated in the camera for overall control of the camera. The microcomputer 51 is connected to a driver 52, which is connected in turn to a motor 53 for swinging the masking plates 14a and 14b.

Figure 10:
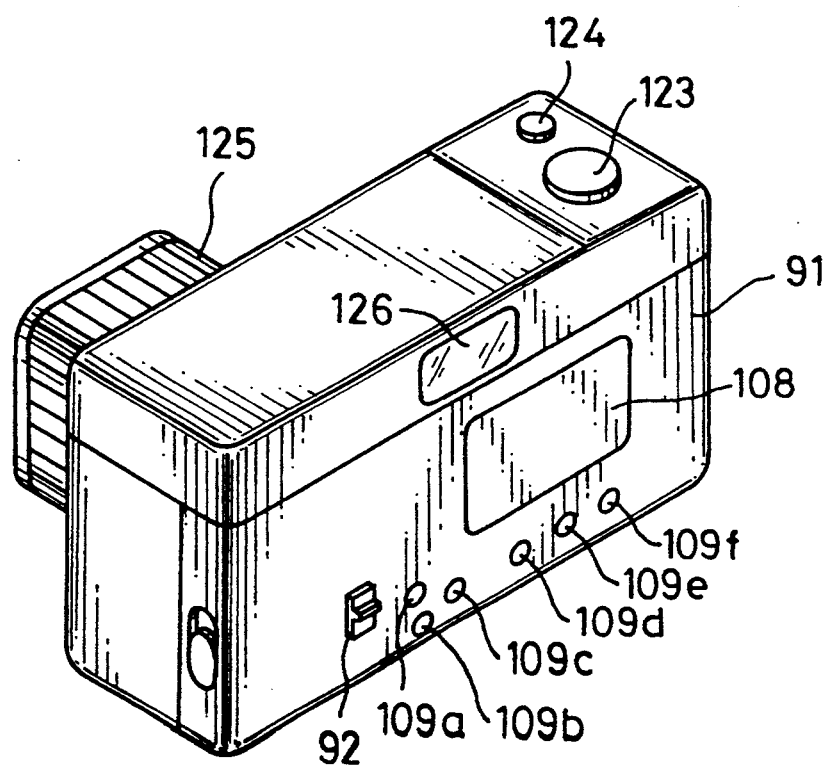
FIG. 10 is a perspective view illustrating a panoramic camera according to yet another preferred embodiment.

When the switch 39 is depressed, the signal generator 50 outputs an On-signal to the control circuit 45 which responsively causes the microcomputer 51 to actuate the driver 52, and to rotate the motor 53. The motor 53 rotates a pair of gears to which the masking plates 14a and 14b are attached to swing the masking plates 14a and 14b open to the full size position, as indicated by the phantom lines in FIG. 3. But when the switch 39 is untouched, the signal generator 50 outputs an Off-signal, so as to swing the masking plates 14a and 14b into the panoramic position, as indicated by the solid lines. Upon a release signal being inputted to the microcomputer 51 from a shutter device (see FIG. 10), the control circuit 45 drives the LCD 31 to display the date information as outputted from the clock circuit 48, and drives the lamp 33. A lamp actuating program has been previously stored, such that the lamp actuating time is varied depend on the full size or panoramic size of the picture. Specifically, the lamp 33 is actuated for a longer period when the switch 39 is untouched than when it is depressed.

The operation of the dater-recordable camera will now be described.

With the cassette 2 inserted in the camera body 11, the rear door 10 is closed and the film is automatically advanced to the position for the first exposure, in the well-known manner. With the lever 38 in the FIG. 2 position, for panoramic photography, mirror 35 intercepts optical axis 32a and the masking plates 14a and 14b are in the full-line position of FIG. 3, ready for panoramic photography. When an exposure is effected, a picture 15 of panoramic size is created on the film 3. The control circuit 45 causes the LCD 31 to display the date information of, for example, "4.1.1", and actuates the lamp 33.

The light from the lamp 33 passes through the condenser lens 32 and illuminates the LCD 31 from the rear. The light passing through the LCD 31 passes through the convex lines 30, is reflected by the mirror 35, passes through the opening 28, and is focussed on the film 3 to expose the emulsion layer located on the front of the film. Numerical data B of "4.1.1" are recorded within the picture 15 as illustrated in FIG. 4, at the right bottom thereof. The digits representing this date are recorded dark on the negative and so are printed white or in a color low in density on the positive. Then the film 4 is wound by one frame to position the next frame for the next exposure, this winding by one frame at a time, and the ultimate rewinding of the entire film back into the cassette, being automatically effected in the usual way.

The changeover lever 38 is swung downward, to retract mirror 35 from the optical axis 3a of the convex lens 30, when full size photography is selected instead of panoramic photography. Upon thus depressing the switch 39, the signal generator 50 generates and emits an On-signal to the control circuit 45, which in turn triggers the microcomputer 51. The microcomputer 51 drives the motor 53 and swings the masking plates 14a and 14b to the open or unmasked position for a full size exposure. Upon a photograph then being taken, a picture 16 of full size is created on the line 3. The control circuit 45 causes the LCD 31 to display the same information of "4.1.1", and actuates the lamp 33 longer than for panoramic photography.

The light from the lamp 33, passing through the condenser lens 32 and the LCD 31, passes through the convex lens 30 and then the concave lens 36, and is reflected by the stationary mirror 37, passing through the opening 29, and is focussed on the film 3. Numerical data A of "4.1.1" are thus created on the picture 16, as illustrated in FIG. 4, in a size larger than the numerical data B in the picture 15, because the optical system including the convex and concave lenses 30 and 36 has a focal length longer than that including the single convex lens 30.

Figure 5:
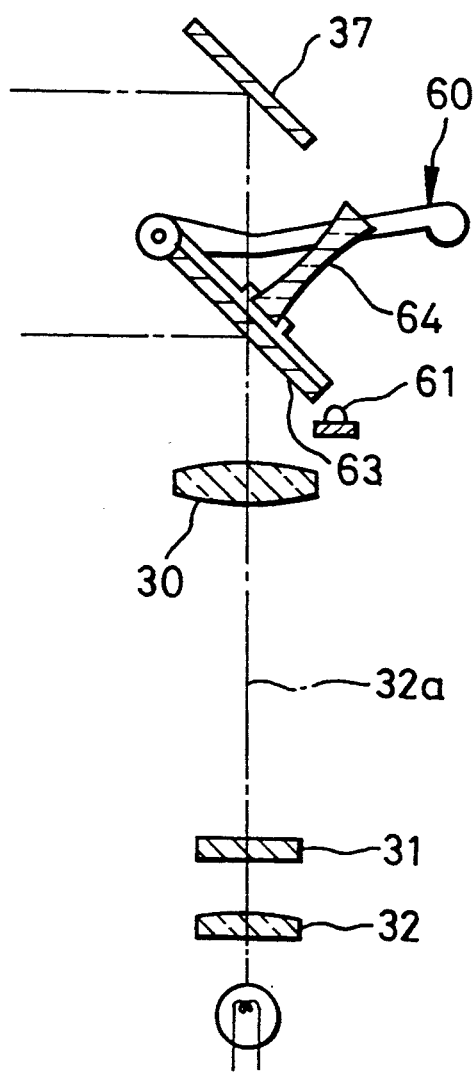
FIG. 5 is a schematic view in vertical cross section illustrating another preferred embodiment.

FIG. 5 illustrates another preferred embodiment. There is provided an operable changeover lever 60, on which both a movable mirror 63 and a concave lens 64 are mounted. As is illustrated, the concave lens 64 retreats from the optical axis 32a, at the same time the movable mirror 63 is inserted in the optical axis 32a for recording the date in panoramic photography. Reference numeral 61 designates a switch operable by the lever 60. Because the concave lens 64 is arranged not fixedly but movably along the optical axis 32a, it is advantageous that the space for the concave lens 64 be small between the convex lens 30 and the stationary mirror 37, particularly for reducing the size of the date recording device.

Figure 6:
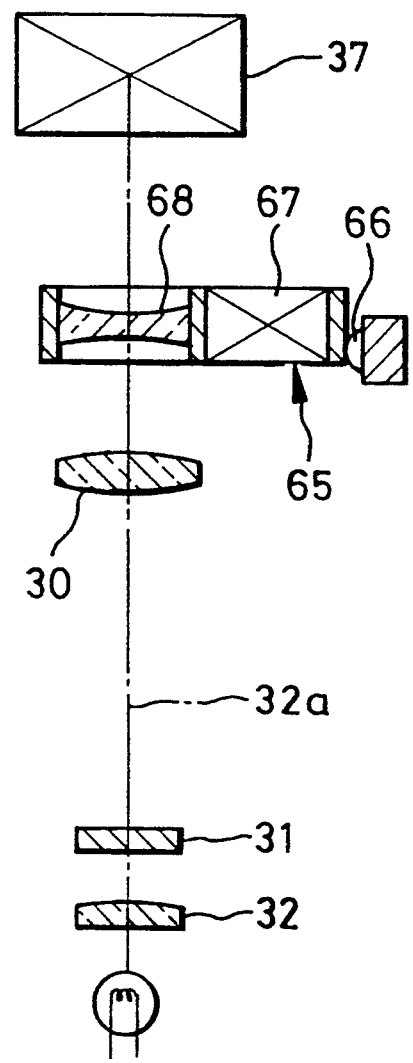
FIG. 6 is a schematic view in vertical cross section illustrating still another preferred embodiment.

FIG. 6 illustrates a further preferred embodiment. There is provided an operable changeover support 65, on which both a movable mirror 67 and a concave lens 68 are mounted. In accordance with sliding movement of the support 65 in tile lengthwise direction of the camera, the concave lens 68 and the movable mirror 67 are inserted, selectively and mutually exclusively, into the optical axis 32a for date recording. Reference numeral 66 designates a switch, functioning as switches 39 and 61, operable by the support 65. This construction is also advantageous for reducing tile size of tile date recording device.

Figure 7:
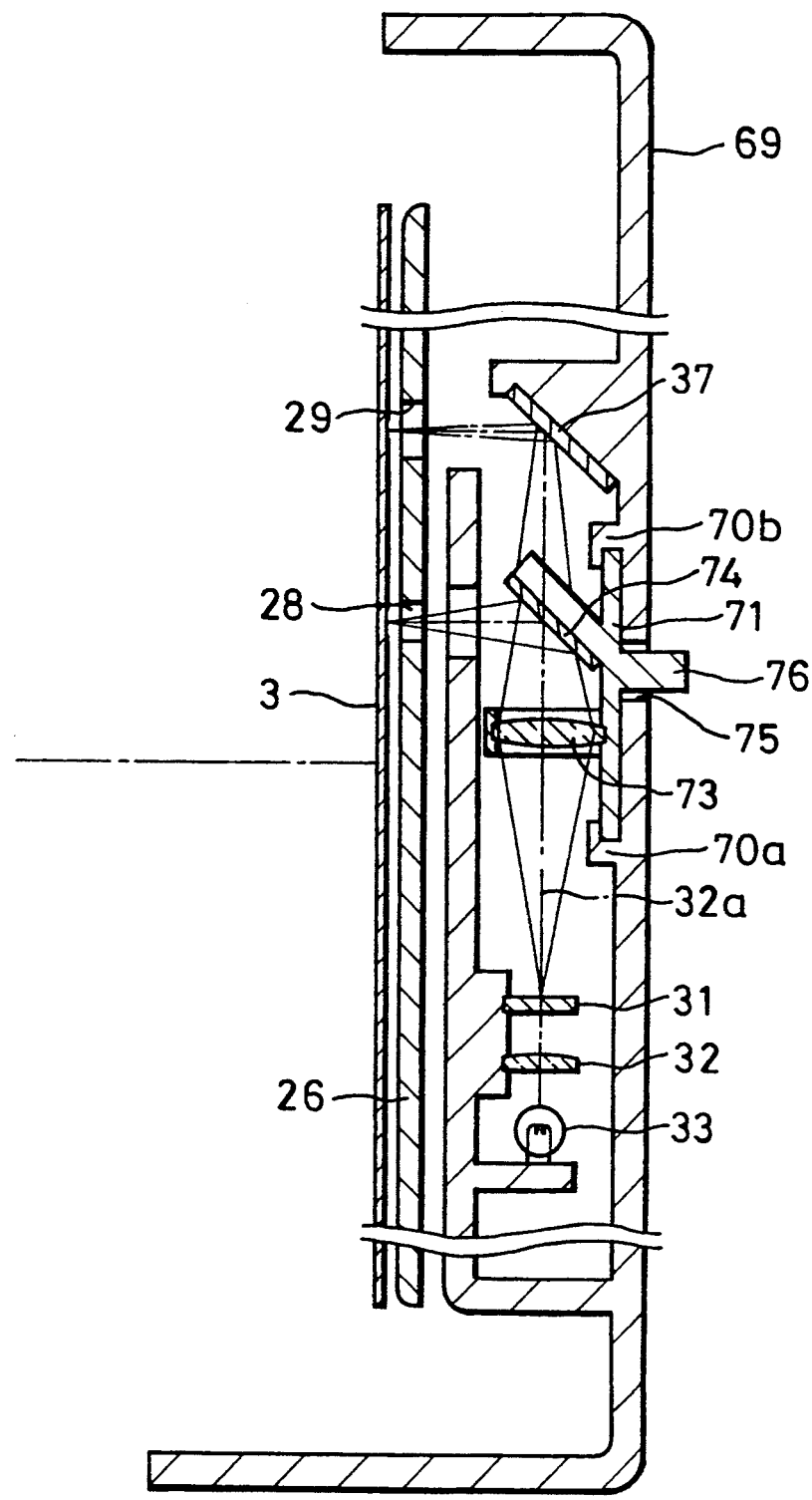
FIG. 7 is a view similar to FIG. 2 illustrating still another preferred embodiment.
Figure 8:
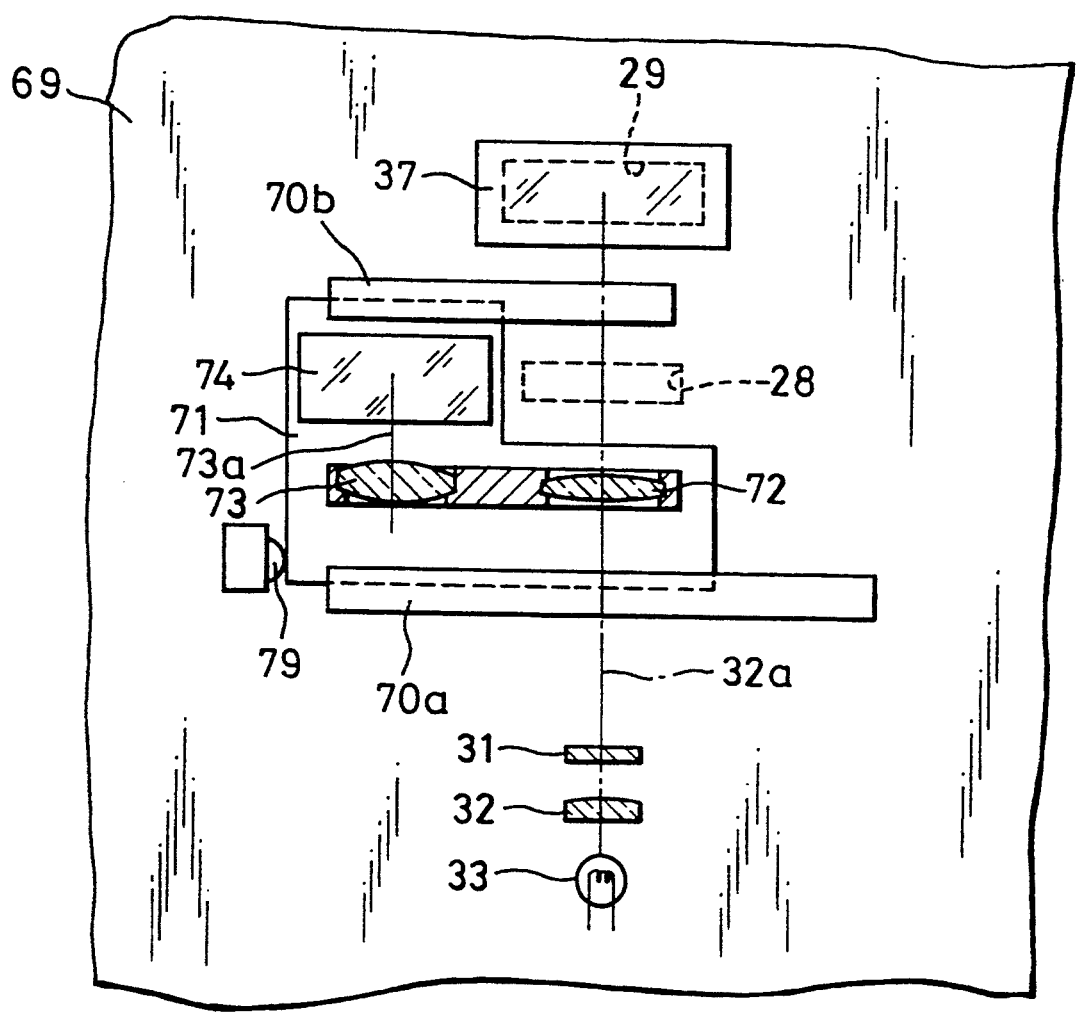
FIG. 8 is an elevation, partly in section, illustrating the novel date recording device in FIG. 7, as viewed upon removal of a pressure plate from the rear door.

FIGS. 7 and 8 illustrate still another preferred embodiment, in which different convex lenses 72 and 73 are selectively used. A changeover support 71 is slidably held between two rails 70 formed on the inside of rear door 69. On the support 71 are mounted the convex lenses 72 and 73 and a mirror 74. The focal length of the convex lens 72 is longer than that of lens 73. The mirror 74 is arranged above lens 73, along the optical axis 73a thereof.

The support 71 is arranged between the LCD 31 and the stationary mirror 37. The support 71 is provided with a projection comprising a changeover button 76 which protrudes through an opening 75 in the rear door 69. The support 71 is thus externally manually operable by the changeover button 76, whether or not the rear door 69 is closed. A toggle spring (not shown) is again used to bias the support 71 toward either of its extreme positions wherein a selected one of the convex lenses 72 and 73 is located in the optical axis 32a.

The recording device is driven in the condition as shown in FIG. 8 for full size photography. The light passes through the LCD 31, through the convex lens 72, to the stationary mirror 37, through the opening 29, and is focussed on the film 3. Switch 79 is depressed and functions as switches 39, 61 and 66. Numerical data A as shown in FIG. 4 are created on the picture 16. But when the date recording device is driven in the condition wherein the support 71 is slid to the right in FIG. 8, the convex lens 73 is located on the optical axis 32a. The light passes through the LCD 31 and the convex lens 72, to the mirror 74, through the opening 28, and is focussed on the film 3. The switch 70 is untouched. Numerical data B as shown in FIG. 4 are created on the picture 15.

Figure 9:
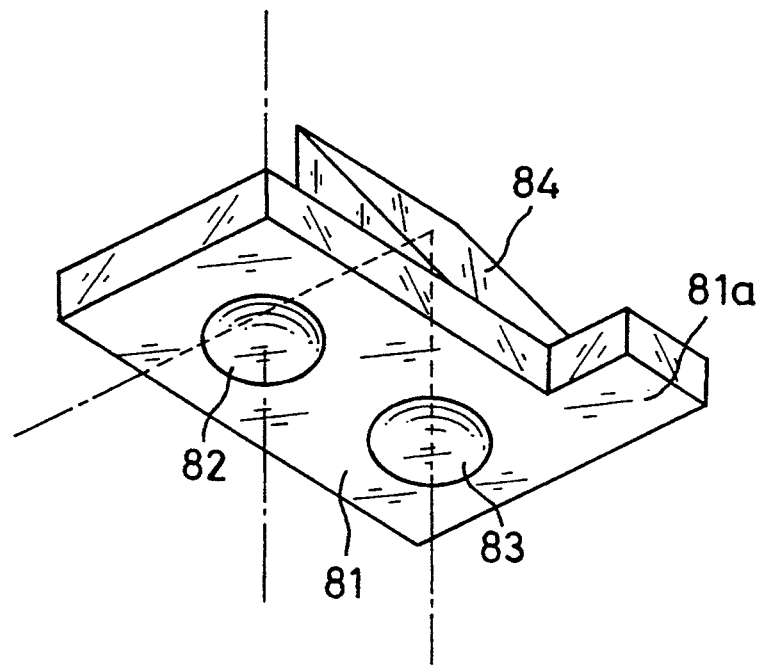
FIG. 9 is a perspective view illustrating a variant part in a novel date recording device.

Instead of the support 71 incorporating the initially separate lenses 72, 73 and mirror 74, a transparent unit 81 as illustrated in FIG. 9 can be used. The unit 81 is provided with a manually operable projection 81a, convex lens portions 82 and 83 and a prism portion 84. This construction is advantageous for reducing the size of the date recording device, particularly by replacing the mirror 74 with the prism 84.

FIGS. 10 to 16 illustrate a preferred embodiment in which two exposing lamps are selectively utilized. Elements similar to those of the former embodiments are designated with the same reference numerals. A rear door 91 incorporates a changeover button 92, an external display 108, and manually operable switches 109a to 109f. On the top of the camera are arranged a release button 123 and a zooming button 124, the latter operated to change the focal length of the taking lens. On the front of the camera is arranged a movable lens barrel 125, which incorporates a movable lens group (not shown) included in the taking lens of the camera. Through a viewfinder 126, the subject to be photographed is observable to the photographer.

Figure 11:
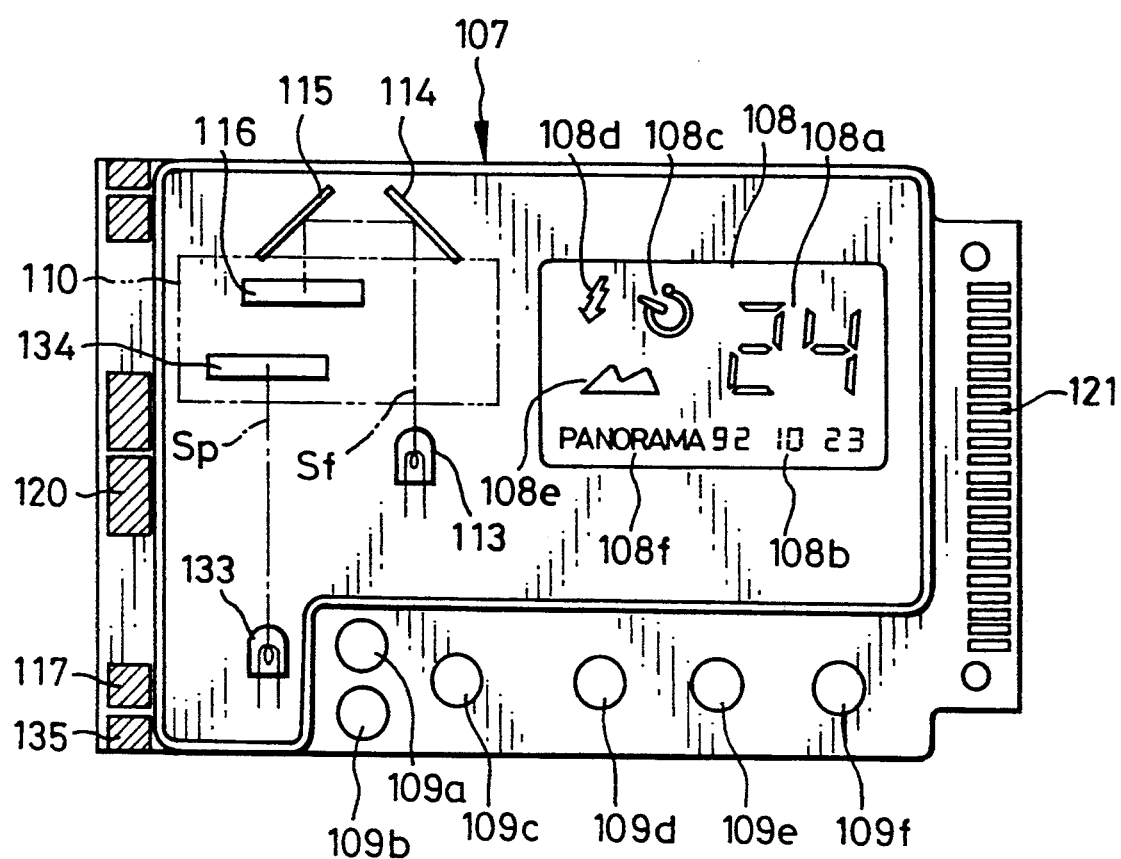
FIG. 11 is an explanatory view illustrating a novel date recording device incorporated in the camera of FIG. 10.
Figure 12:
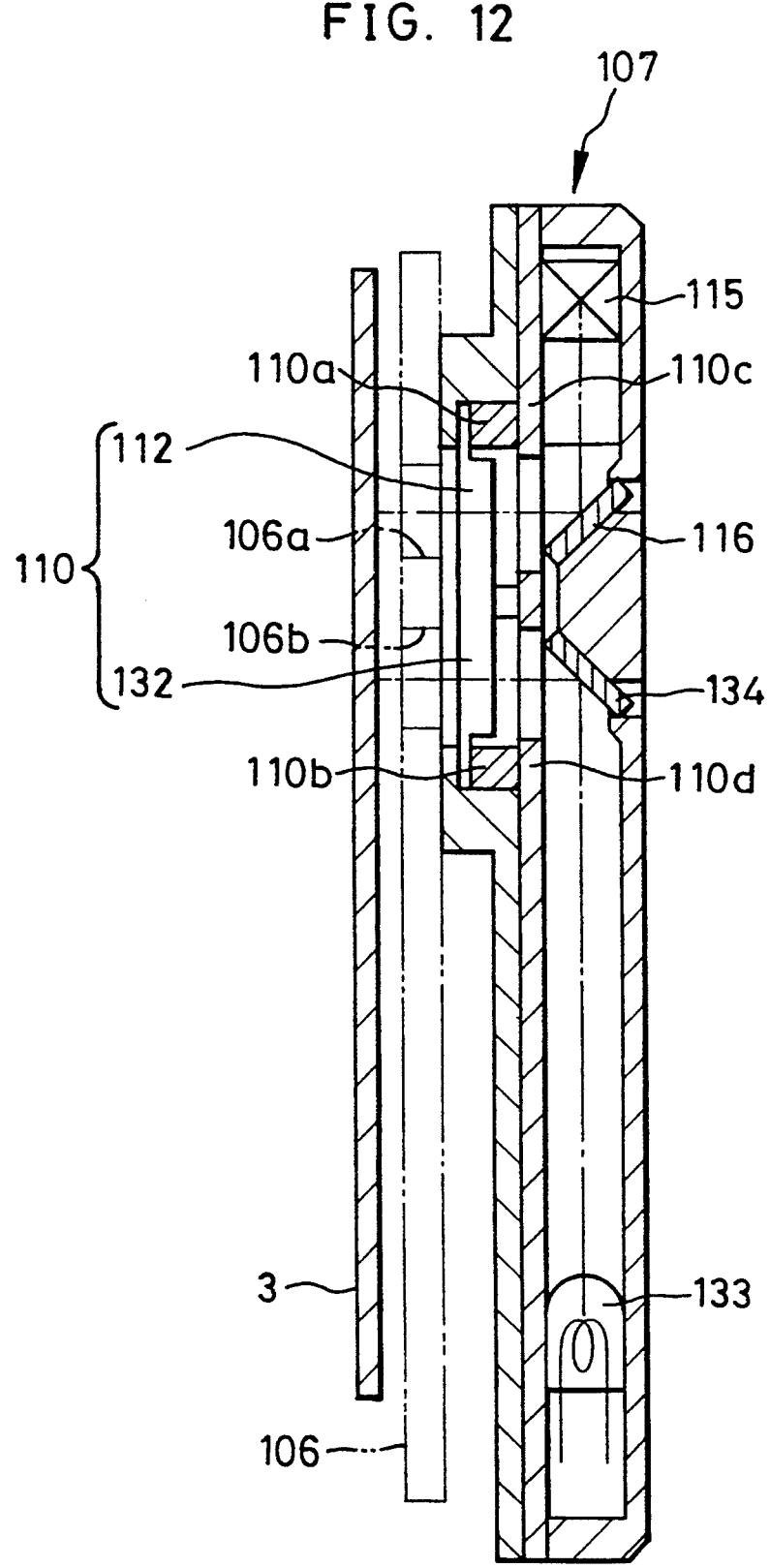
FIG. 12 is a cross section of the date recording device of FIG. 11, together with a fragment of the film.
Figure 13:
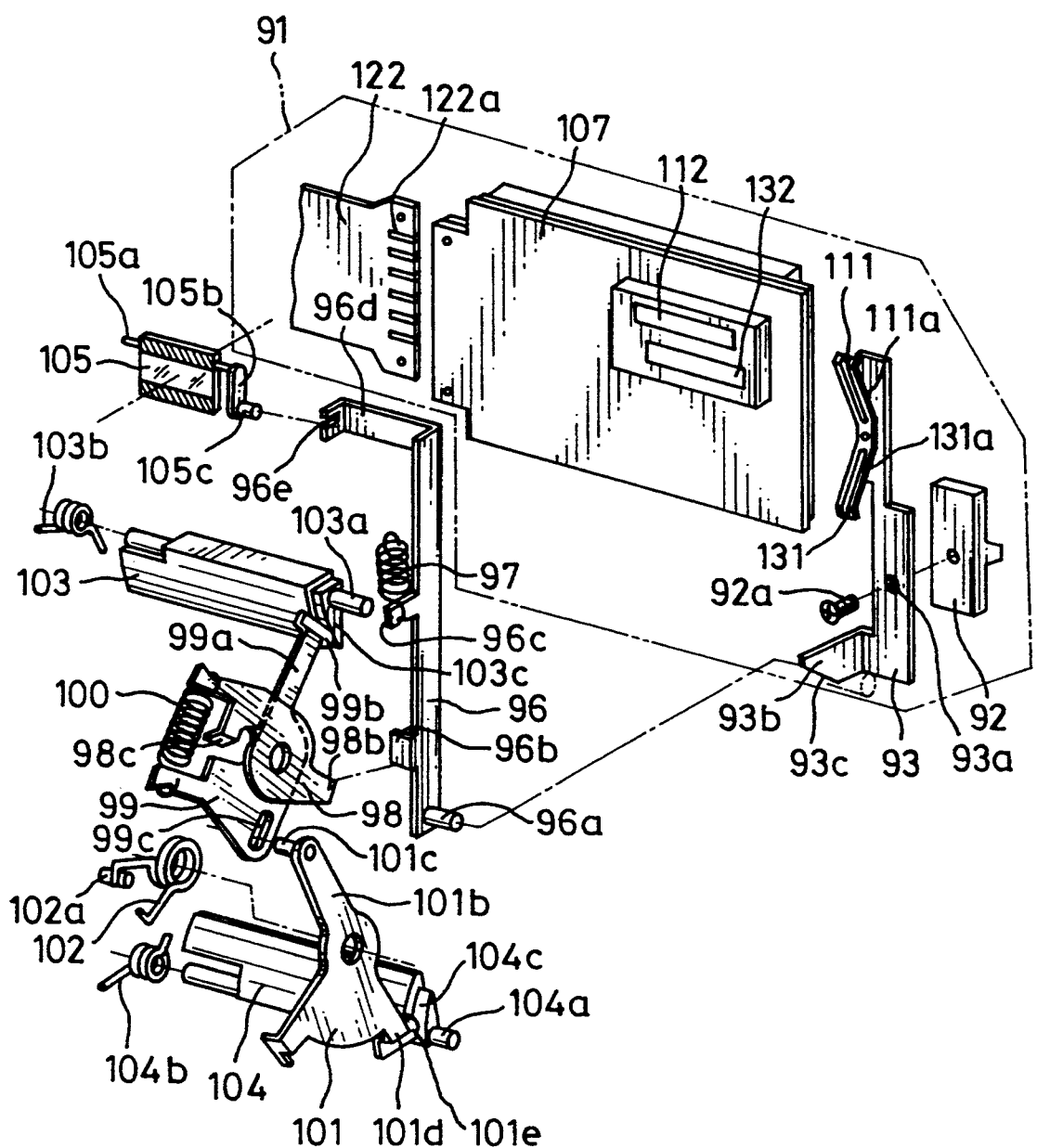
FIG. 13 is an exploded perspective view schematically illustrating a masking mechanism of the novel camera.

According to another embodiment illustrated in FIGS. 11 and 12, the rear door 91 incorporates a date recording device 107 for recording data on the film 3. A single LCD panel 110 is arranged face to face with the film 3 as positioned at the exposure aperture 13 and includes two panel portions 112 and 132, which are adapted to display the data to be recorded, such as date and/or time. The upper panel portion 112 is used for recording data on the full size picture 16. The lower panel portion 132 is used for recording data on the panoramic size picture 15, which is created by masking with a pair of opaque masking plates 103 and 104. The film (not shown) is positioned by being pressed by a film pressure plate 106.

In the display 108, there are indicated numerical information 108a as to the remaining frames, temporal information 108b as to the date and/or time, self-photography mode information 108c, flash enabling information 108d, far-distance scene information 108e, panoramic photography mode information 108f, etc. The switch 109a rewinds the film and is useful when the photographer desires to remove the film even while there remain unexposed frames. The switch 109b is a far distance switch adapted to move the taking lens to a position wherein the taking lens is focussed on infinity. The switch 109c is adapted to emit a flash deliberately, e.g. when taking a rear-lighted scene. The date switches 109d to 109f are adapted to manually correct or adjust the date as to year, month and day.

The date recording device 107 incorporates a first lamp 113 for recording the date on the full size picture 16, and a second lamp 133 for recording the date on the panoramic size picture 15. Respective optical paths Sf and Sp from the lamps 113 and 133 are directed to the top of the camera, perpendicular to the optical axis S of the taking lens. A mirror 114 above the first lamp 113 reflects the light from the first lamp 113 to the left, onto a mirror 115. The mirror 115 reflects the light downward onto a mirror 116, which reflects the light toward the front. A mirror 134 above the second lamp 133 reflects the light from the second lamp 133 toward the front.

The upper panel portion 112 is illuminated by the light from the mirror 116, and the lower panel portion 132 is illuminated by the light from the mirror 134. The single LCD 110 is provided on one side with a pair of layer-arranged conductive connectors 110a and 110b, which are in contact with respective terminals 110c and 110d, and thereby supplied with electric power.

The actuation of the date recording device 107 is selectively switched through terminals 117, 120 and 135. A pair of switching segments 111 and 131 are movable in accordance with manual operation of a changeover button 92 via an elongated member 93 (see FIG. 13), and are pressed against the surface of the terminals 117, 120 and 135 by spring arms 111a and 131a. Specifically, when the changeover button 92 is slid up for full size photography, the segment 131 is in contact with the terminal 117, at the same time the segment 111 is in contact with the terminal 120, so that the terminals 117 and 120 are short-circuited to generate a full size photography signal. When the changeover button 92 is slid down for panoramic photography, the segment 131 comes into contact with the terminal 135, while the segment 111 remains on the terminal 120, so that the terminals 120 and 135 are short-circuited to generate a panoramic photography signal.

As is illustrated in FIG. 11, on the date recording device 107 is arranged an array 121 of terminals, which are connected to an array 122a of terminals (FIG. 13) on a connector cable 122. The connector cable 122 is adapted to connect the date recording device 107 to the microcomputer 51 (see FIG. 5) by connection between the terminal arrays 121 and 122a. Note that the pressure plate 106 in FIG. 12 is omitted from FIG. 13.

When panoramic photography is to be designated, the changeover button 92 on the rear door 91 is slid to the lower position. An aperture masking mechanism is thus moved from the condition of FIG. 14 to the condition of FIG. 15. The elongated member 93, fixed to the button 92 by a screw 92a through a hole 93a, slides downward with the button 92. A drive end 93b of the member 93 is in contact with a pin 96a of an elongated member 96 as indicated by the phantom line. By sliding downwardly the member 93, the member 96 is slid down against the bias of a spring 97 acting on a projection 96c. A drive projection 96b on member 96 presses down a driven end 98b of an intermediate lever 98. The intermediate lever 98 rotates clockwise, as viewed in FIGS. 13 to 15, around a shaft 98a.

The clockwise rotation of the intermediate lever 98 stretches a tension spring 100 whose recovery force causes an upper lever 99 to rotate clockwise around the shaft 98a. A portion 99a of the upper lever 99 swings, so as to cause a drive end 99a to press against a driven portion 103c of the upper masking plate 103, which swings counterclockwise about a shaft 103a against the force of a spring 103b.

Engagement of a pin 101c in a slot 99c formed in a portion 101b of lever 99 is adapted to link the upper lever 99 with a lower lever 101. The clockwise rotation of the upper lever 99 causes the slot 99c to press the pin 101c to the front. The lower lever 101 rotates counterclockwise against the force of a spring 102 attached to a pin 102a. The lower lever 101 has a portion 101d, of which a drive end 101e presses a driven portion 104c of the lower masking plate 104, which rotates clockwise around a shaft 104a against the force of a spring 104b.

The masking plates 103 and 104 are then so positioned as to mask the exposure aperture 13 to the panoramic size. This condition is maintained by a locking mechanism (not shown) associated with either the member 93 or the member 96 for retaining it in its lower position.

The member 96 has an upper portion 96d in which there is formed a recess 96e for operating a pin 105c of a crank 105b. A partly transparent plate 105 is arranged to be swingable up and down within the field of viewfinder 126, and gives the photographer a visible indication of the panoramic field of view when swung down. Movement of the member 96 downwardly causes the recess 96e to swing down the pin 105c about a shaft 105a. The plate 105 is thus brought into the photographer's field of view in the viewfinder 126.

With the member 93 slid down, the terminals 120 and 135 are short-circuited by contact with the segments 111 and 131, so that the date recording device 107 is driven to record the date on the panoramic picture 15 in response to an operation of the shutter button 123.

There appears the indicium 108f PANORAMA in the display 108 as illustrated in FIG. 11, for convenience of visual recognition of the panoramic photograph mode. There also appear the remaining frame indicium 108a, and the date indicium 108b. The other indicia 108c or 108e appear if the corresponding operation is designated according to the photographer's selection.

A shutter releasing operation causes the microcomputer to send a control signal to the date recording device 107 so as to turn on the second lamp 133. The light from the second lamp 133 is directed by the mirror 134 to the front, and illuminates the lower panel portion 132, which is near, but lower than, the masking plate 103. The light from the panel portion 132 passes through a lower opening 106b in the pressure plate 106, and exposes the film 3 from The rear to record numerical data 142 on the picture 15.

Figure 14:
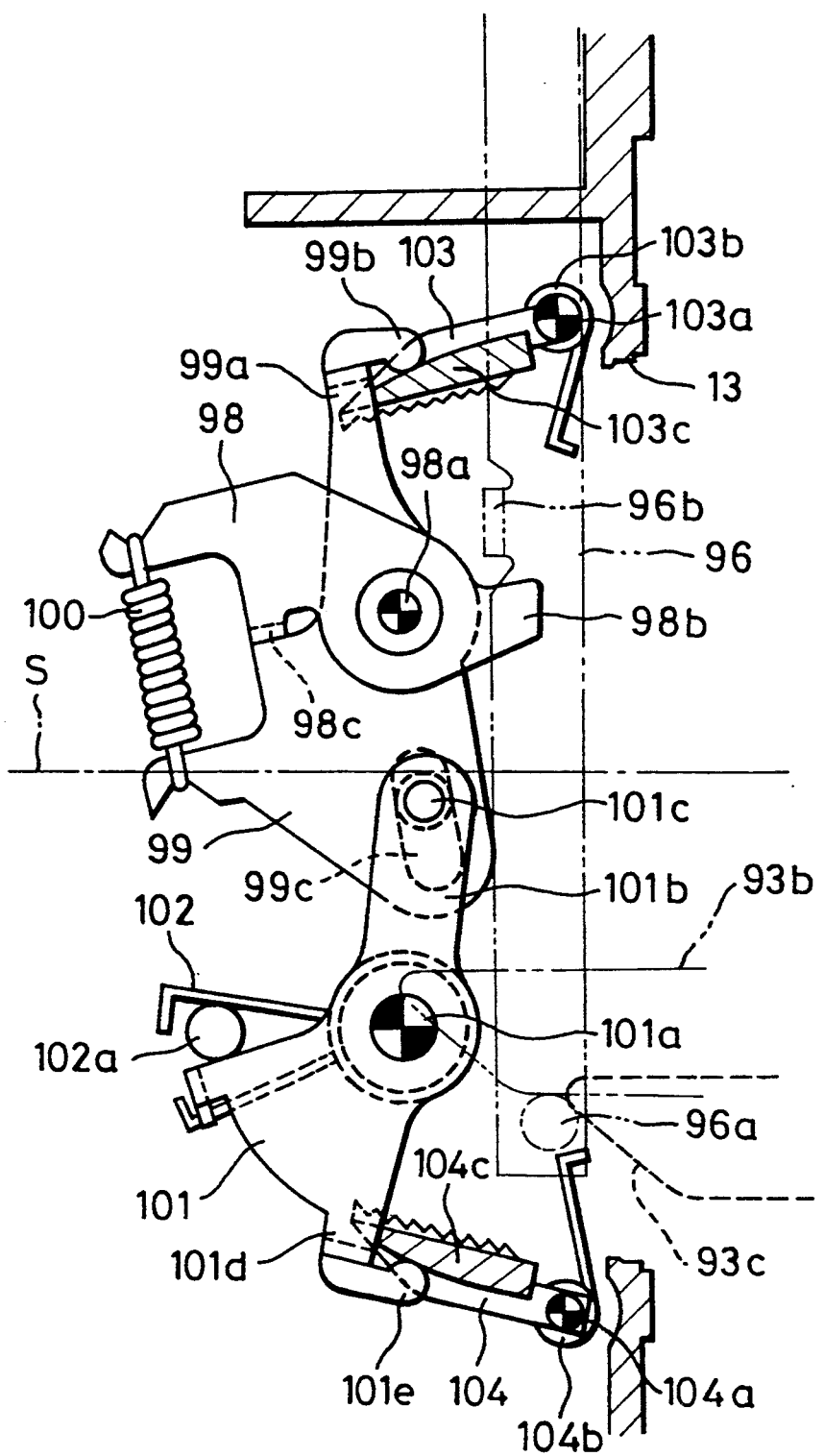
FIGS. 14 and 15 are fragmentary side views schematically illustrating the masking mechanism in FIG. 13.
Figure 15:
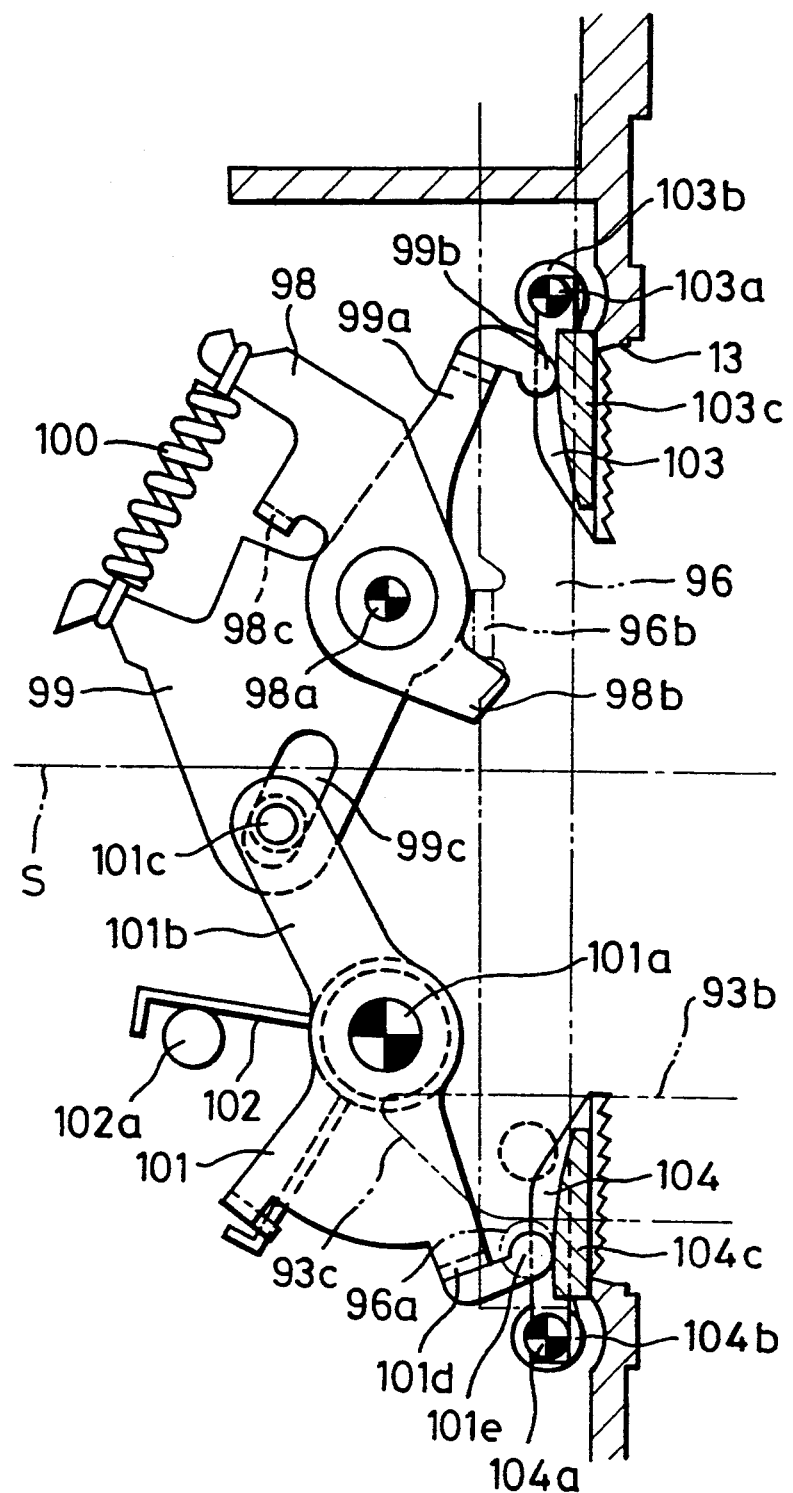
Figure 16:
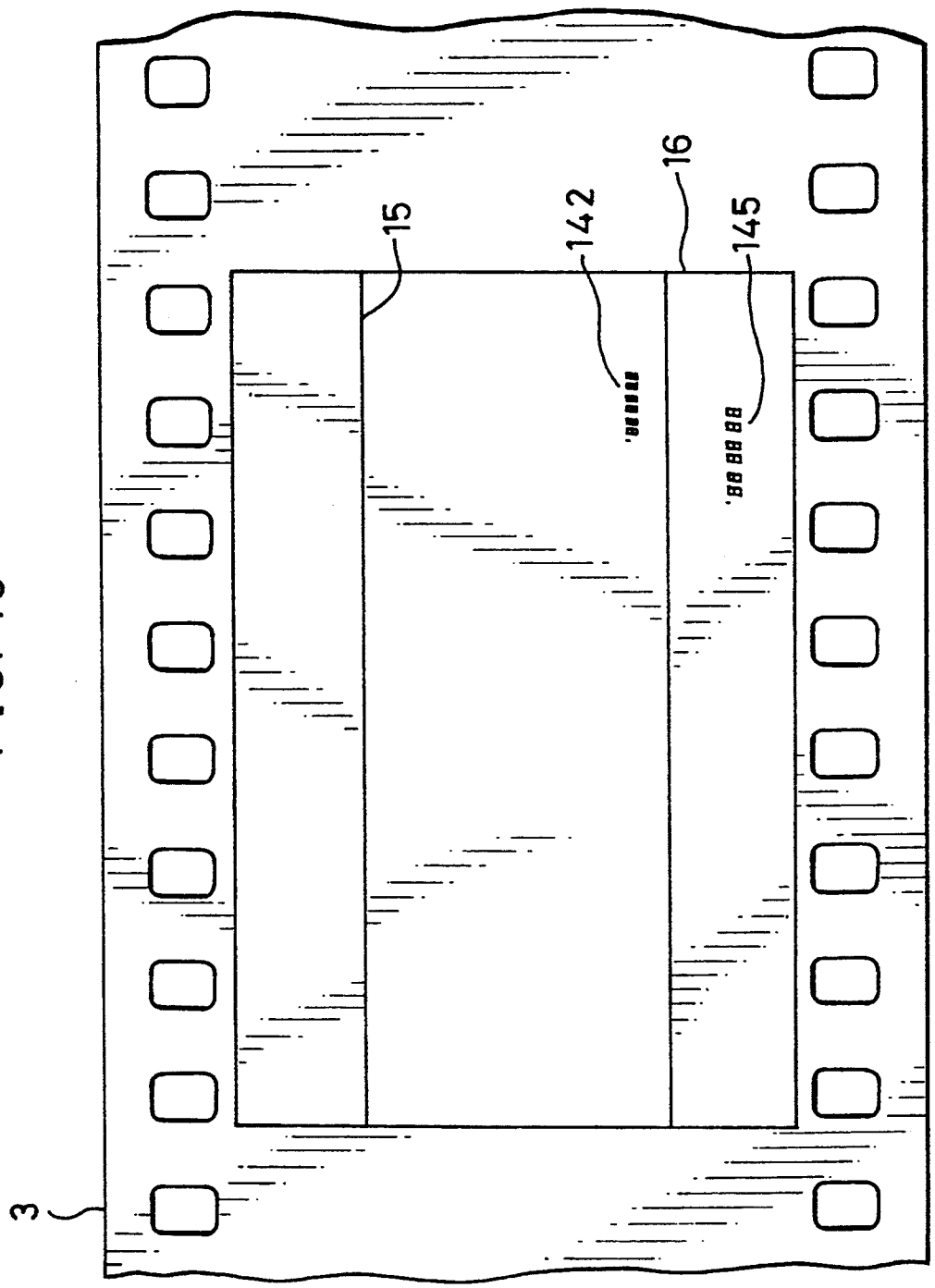
FIG. 16 is a view illustrating a fragment of the film as used in the novel camera.

When full size photography is again designated, the mechanism is moved from the condition shown in FIG. 15 to the condition shown in FIG. 14. The changeover button 92 is slid to the upper position, while the above-mentioned locking mechanism (not shown) is released. A release of the locking mechanism preferably can be effected by a forced upward movement of the changeover button 92. The member 93 slides up with the button 92. The drive end 93b is detached from the pin 96a. The member 96 as released from the member 93 slides up under the bias of the spring 97. The driven end 98b is released form the drive projection 96b. The intermediate lever 98, as freed, rotates under the bias of the tension spring 100, counterclockwise about the shaft 98a. A contact end 98c of the intermediate lever 98 comes into contact with a side of the upper lever 99, and regulates the levers 98 and 99 angularly despite the bias of the tension spring 100.

The lower lever 101 is also released from the drive of the upper lever 99, and rotates under the bias of the spring 102, clockwise about shaft 101a. The driven portion 104c is released from the drive end 101e. The lower masking plate 104 rotates counterclockwise about the shaft 104a, under the bias of the spring 104b, and retreats from the inside of the exposure aperture 13.

The clockwise rotation of the lower lever 101 causes the pin 101c to press the slot 99c to the rear, so that the upper lever 99 rotates counterclockwise about the shaft 98a. The driven portion 103c is released from the drive end 99b. The upper masking plate 103 rotate clockwise about the shaft 103a. under the bias of the spring 103b, and retreats from the inside of the exposure aperture 13. The exposure aperture 13 is then fully open to be ready for exposure of a full size picture 16.

With the member 93 slid up, the terminals 117 and 120 are short-circuited by contact with the segments 111 and 131, so that the date recording device 107 is driven to record the date within the full size picture frame 16 in response to operation of the shutter button 123. No PANORAMA indicium appears in the display 108.

A shutter releasing operation causes the microcomputer to send a control signal to the date recording device 107 so as to turn on the first lamp 113. The light form the first lamp 113 is directed by the mirror 114 to the left, by the mirror 115 downward, by the mirror 116 to the front, and illuminates the upper panel portion 112, which is near, but lower than, the upper edge of the exposure aperture 13. The light from the panel portion 112 passes through an upper opening 106a in the pressure plate 106, and exposes the film 3 from the rear to record numerical data 145 on the picture 16.

While the rear door 91 is open prior to exposure, the member 96 ius freed from the drive end 93b, and thus assumes the upper position under the bias of the spring 97, wherein the masking plates 103 and 104 are initially ready for full size photography. For panoramic photography, the changeover button 92 can be first slid down to the panoramic position, before the rear door 91 is closed. Upon closure of the rear door 91, the drive end 93b contacts the pin 96a from the rear while advancing an angled side 93c, as indicated by the broken line in FIG. 14. The angled side 93c causes movement of the member 93 so as to slide downward the member 96, until the masking plates 103 and 104 are brought to a position to mask the exposure aperture 13 for panoramic photography.

Figure 17:
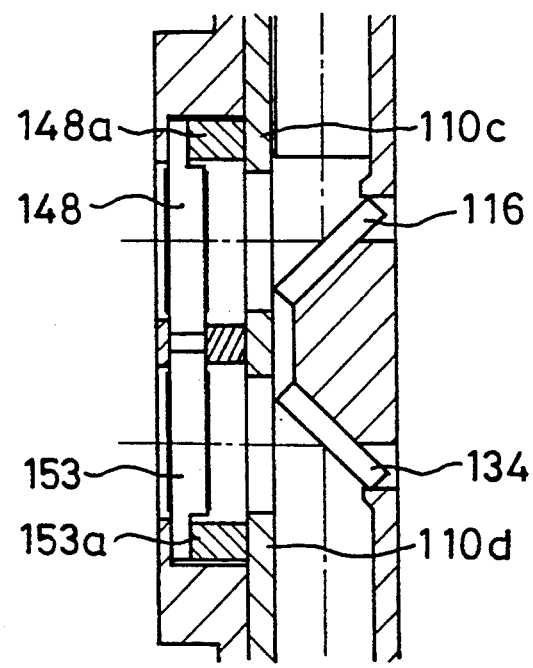
FIG. 17 is a fragmentary cross section illustrating important portions of another preferred embodiment of date recording device.

The above embodiment is of low cost owing to a single LCD panel 110. FIG. 17 illustrates a modified embodiment, in which the former single LCD panel 110 is replaced with two LCD panels 148 and 153 arranged beside each other and adapted to display the date to be recorded. The upper LCD 148 records the date on full size pictures 16. The lower LCD 153 records the date on panoramic size pictures 15. The LCDs 148 and 153 are provided with respective layer-arranged conductive connectors 148a and 153a, which are in contact with terminals 110c and 110d.

This construction is further favorable in that, when in the full size photography mode, the light incident on the upper LCD 148 is prevented from leaking onto the lower LCD 153, so as to avoid undesirable illumination through the front of the lower LCD 153.

Figure 18:
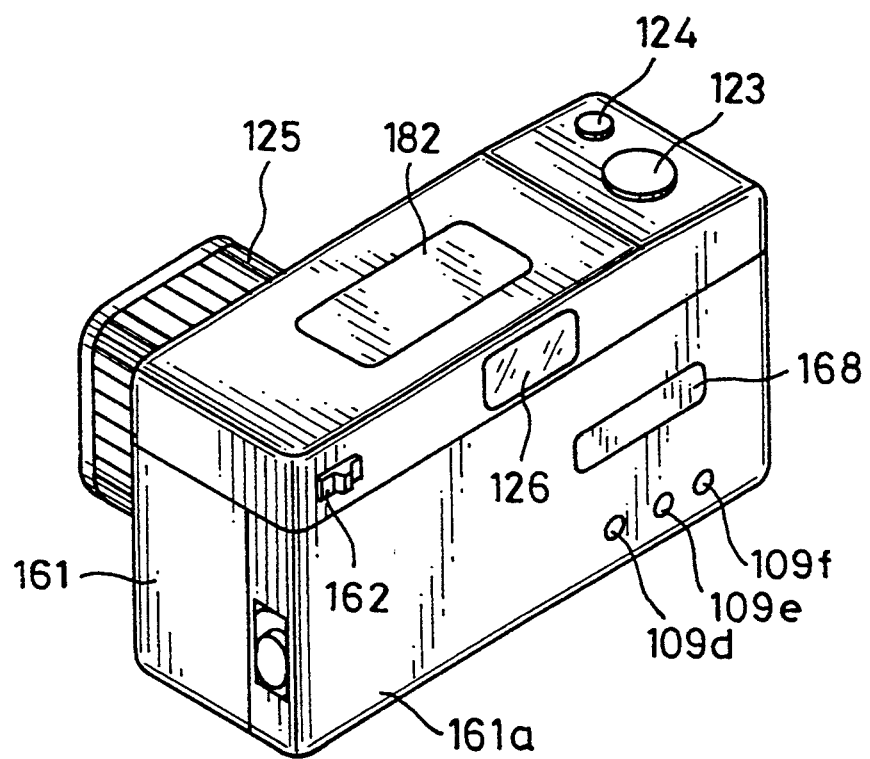
FIG. 18 is a perspective view illustrating a panoramic camera according to still another preferred embodiment.
Figure 19:
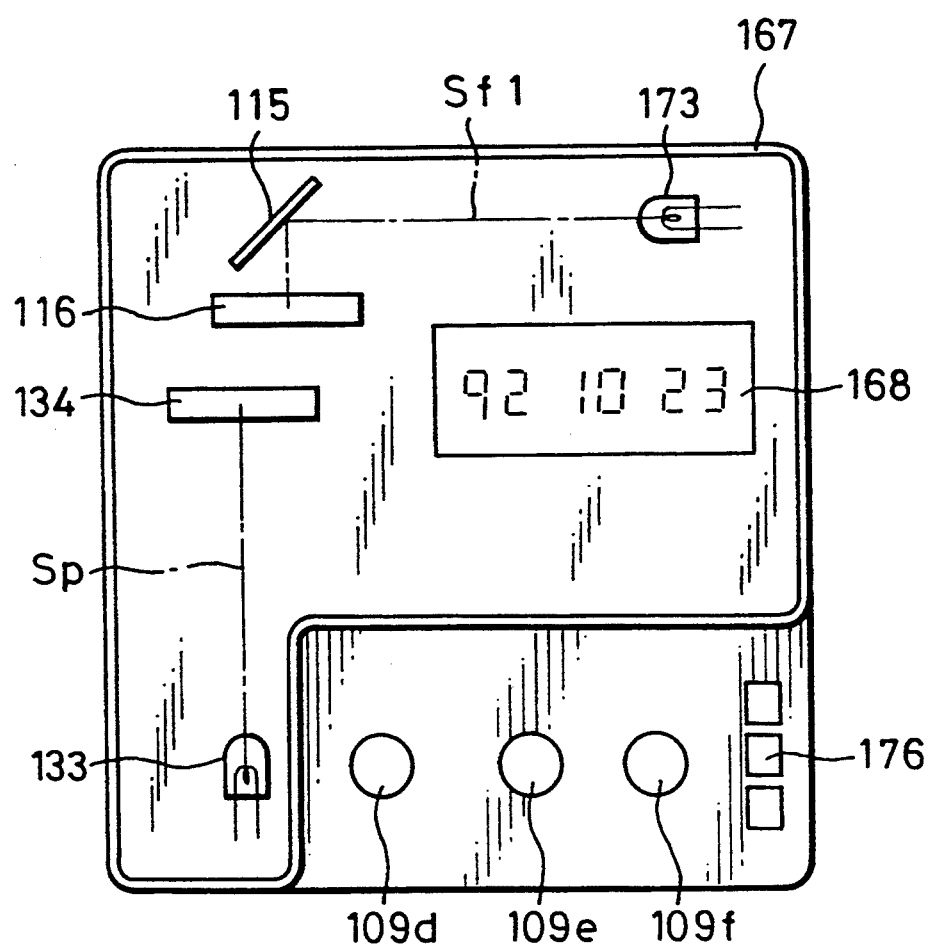
FIG. 19 is a view illustrating a novel date recording device incorporated in the camera in FIG. 18.
Figure 20:
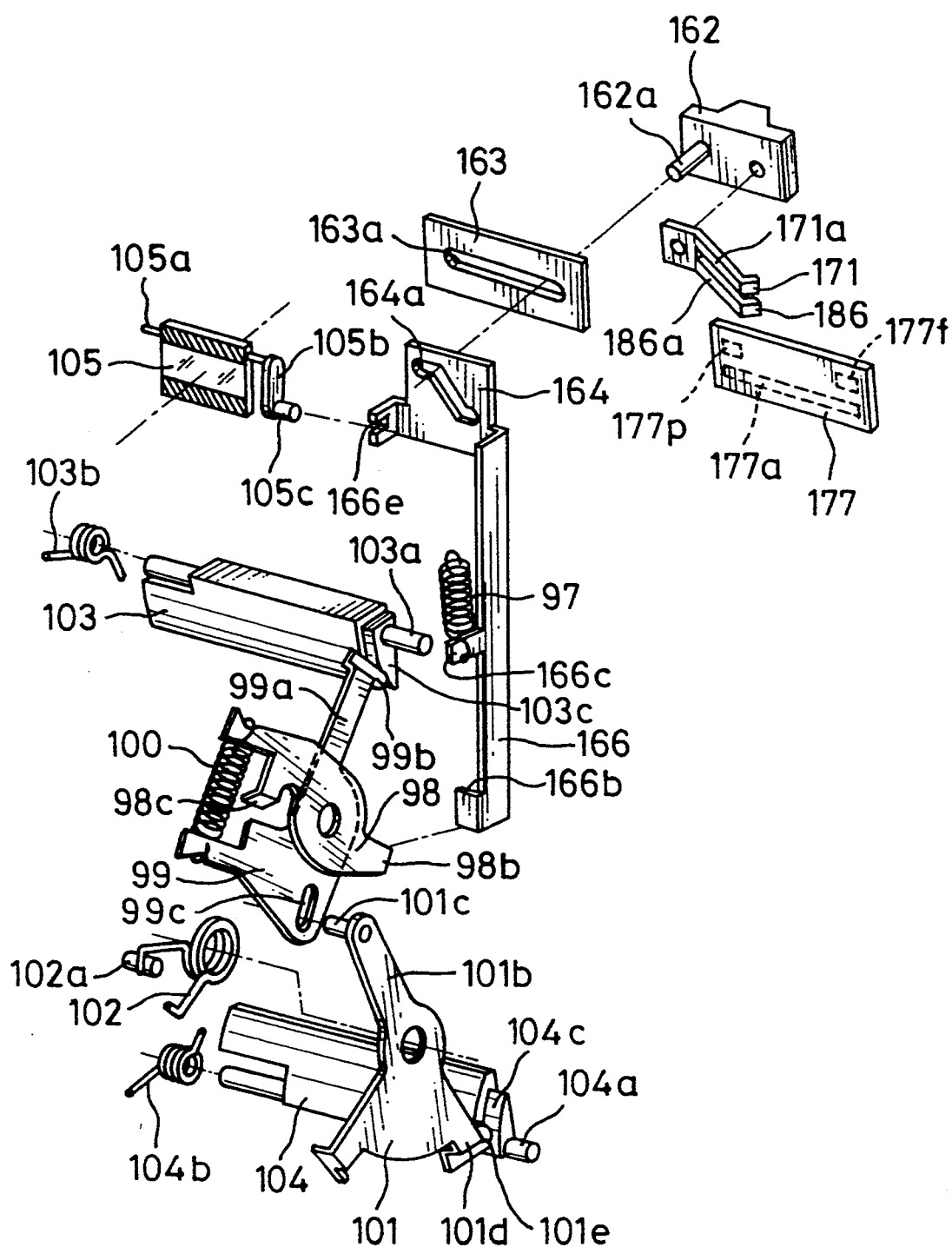
FIG. 20 is an exploded perspective view schematically illustrating the masking mechanism in the novel camera of FIGS. 18 and 19.

FIGS. 18 to 20 illustrate still another preferred embodiment. Elements similar to those of the former embodiments are designated with the same reference numerals. In a rear door 161a, a rear display 168 for displaying date information appears as well as the date switches 109d, 109e, and 109f associated with the display 168. A changeover button 162 appears on the rear of camera body 161. On the top of the camera body 161, there is arranged an upper display 182 for displaying numerical information as to remaining frames, the self-photography mode information, the flash enabling information and the like. The display 182 is also under the control of the microcomputer 51.

As illustrated in FIG. 19, a date recording device 167 incorporates a first lamp 173 for recording the date on full size pictures 16, and the second lamp 133 the same as before. The optical path Sf1 of the lamp 173 is horizontal. The mirror 115 to the left of the first lamp 173 reflects the light downward onto mirror 116, which reflects the light toward the front. The upper LCD 148 as illustrated in FIG. 17 is illuminated by the light from the mirror 116, and the lower LCD 153 is illuminated by the light from the mirror 134.

On the date recording device 167 is arranged an array 176 of terminals, which are connected to terminals which are not shown but which are adapted to connect the date recording device 167 to the microcomputer 51 (see FIG. 5). As is illustrated in FIG. 20, a plate 163 inside the camera body 161 is provided with a slot 163a, through which a pin 162a of a changeover button 162 is inserted for guidance of the button 162 along the slot 163a.

The actuation of the date recording device 167 is selectively switched through terminals 177a, 177f and 177p on a board 177 within the camera body 161. Switching segments 171 and 186 are movable in accordance with the changeover button 162, and are pressed against the board 177 of the terminals 177a, 177f and 177p by spring arms 171a and 186a. Specifically, when the changeover button 162 is slid for full size photography to the right in FIG. 20, the segment 171 is in contact with the terminal 177f, at the same time that the segment 186 is in contact with the terminal 177a, so that the terminals 177f and 177a are short-circuited to generate a full size photography signal. When the changeover button 162 is slid for panoramic photography to the left in FIG. 20, the segment 171 contacts the terminals 177p, while the segment 186 remains at the terminal 177a, so that the terminals 177a and 177p are short-circuited to generate a panoramic photography signal.

When panoramic photography is to be designated, the changeover button 162 is slid to the right in FIG. 18. The pin 162a slides together with the button 162. In FIG. 20, a cam 164 is formed on the top of an elongated member 166, is slidable vertically, and has a cam slot 164a so slanted as to convert horizontal movement of the pin 162a to vertical movement of the cam 164. When the button 162 is slid to the left, the cam 164 is slid downward. By sliding downward the cam 164, the member 166 is slid downward against the bias of the spring 97 attached to a projection 166c. A drive projection 166b at the lower ed of member 166 presses down the driven end 98b of the intermediate lever 98. The intermediate lever 98 rotates clockwise, to produce the operation described above.

The masking plates 103 and 104 are then so positioned as to mask the exposure aperture 13 to the panoramic size. This position is maintained by a locking mechanism (not shown) associated with either the member 166 for retaining it in its bottom position, or by an unslanted end of the cam slot 164a where it is insensitive to the pin 162a. The cam 164 has a lateral end, in which there is formed a recess 166e for operating the pin 105c. Movement of the cam 164 downward causes the recess 166e to swing down the pin 105c. The plate 105 is brought into the photographer's field of view through the viewfinder 126.

With the terminals 177a and 177p short-circuited by contact with the segments 171 and 186, the date recording device 167 is driven to record the date within the panoramic picture frame 15, upon a signal from the microcomputer 51. There appears the indicium PANORAMA in the upper display 182, for convenience of visual recognition. A shutter releasing operation causes the microcomputer 51 to send a control signal to the date recording device 167 so as to turn on the second lamp 133, from which the light illuminates the lower LCD 153. The light from the lower LCD 153 exposes the film 3 from the rear to record the numerical data 142 on the picture 15.

When full size photography is again designated, the changeover button 162 is slid to the left in FIG. 18, while the above-mentioned locking mechanism (not shown) is released. A release of the locking mechanism preferably can be effected by a forced movement of the changeover button 162 to the left. In FIG. 20, the pin 162a is slid by the button 162. The cam slot 164a receives a force to the left so as to move the cam 164 upward. The member 166 is slid up, under the bias of the spring 97. The driven end 98b is released from the drive projection 166b. The intermediate lever 98, as freed, rotates counterclockwise, under the bias of the tension spring 100, and this is followed by the operation as described previously.

With the terminals 177a and 177f short-circuited by contact with the segments 171 and 186, the date recording device 167 is driven to record the date on the full size picture 16, upon receipt of a signal from the microcomputer 51. A shutter releasing operation causes the microcomputer 51 to send a control signal to the date recording device 167 so as to turn on the first lamp 173, from which the light is directed by the mirror 115 downward, by the mirror 116 to the front, and illuminates the upper LCD 148. The light from the upper LCD 148 exposes the film 3 from the rear to record the numerical data 145 on the picture 16.

Although the masking plates 14a, 14b, 103 and 104 in the above embodiments are opaque, alternatively they may have other characteristics: semi-transparency, color transparency, or the like, in order to designate the narrowed area on the film to be printed, as viewed before printing but after development. The masking plates 14a, 14b, 103 and 104 may also be a pair of rectangular frame members, which is favorable for eduction of the weight of the masking mechanism. Furthermore, the exposure aperture 13 may be masked by an LCD panel which can be turned from transparent to opaque and back.

The novel construction is also applicable to a camera with an exposure aperture changeable between full size and a small size to which the longitudinal range of full size is reduced, such as half size. In such a construction, a lamp as a light source is so arranged as to form an optical path which runs, not vertically, but horizontally. Two selectable positions at which to record the numerical data are predetermined in an arrangement, not vertical, but horizontal.

Although the present invention has been described as to its application to camera changeable between full size photography and panoramic photography, the novel construction is applicable to camera with an exposure aperture changeable between full size and nay one small size to which the vertical range of the full size is reduced, such as a high-definition television (HDTV) size which has the aspect ratio of 1.78.

The present invention is also applicable to a camera which is changeable between three or more sizes of picture frames, such as full size, panoramic size and HDTV size.

The present invention is applicable to a camera incorporating two data recording devices adapted to record the numerical data along respectively horizontal and vertical sides of a picture frame, so as to be changeable according to an orientation in which the camera is held by a photographer, either horizontal or vertical.

The exposure aperture 13, in the above embodiments, is so masked as to set an aspect ratio of a picture on the film to be that of a photoprint. Alternatively, there may be recorded pictures of full size on the film, despite the aspect ratio of photoprints as intended. For printing, a photofinisher can recognize the intended aspect ratio on the basis of visual inspection of the negative picture frame, in accordance with either of the possible positions wherein the photographer has recorded numerical data. Otherwise, photographic film may be manufactured as coated with a transparent magnetic layer, on which an intended aspect ratio for printing may be recorded inside the camera when taking a photograph, so that a reduced area within the picture can be printed on photographic paper. In either case, the viewfinder field can be changed in accordance with the size selected.

Although the present embodiments have been described as applied to the compact camera shown in the drawings, alternatively the present invention is also applicable to a single-lens reflex camera.

Although the present invention has been fully described by way of the preferred embodiments thereof with reference to the accompanying drawings, various changes and modifications will be apparent to those having skill in this field. Therefore, unless otherwise these changes and modifications depart form the scope of the present invention, they should be construed as being included therein.

What is claimed is:

1. A camera comprising:

size designating means for designating one of at least first and second picture sizes in order to determine before effecting exposure a picture size to be printed photographically, said second size being smaller than said first size, in which a first area is used for photographic printing in accordance with a picture as formed on photographic film upon designating said first size, and a second area is used for photographic printing at a larger printing magnification in accordance with a picture as formed on said film upon designating said second size;

first data recording means for recording first data within said first area;

second data recording means for recording second data within said second area, said second data being smaller than said first data;

selector means for selecting one of said first and second data recording means in accordance with designation of said sizes by said size designating means;

said first data recording means including a liquid crystal display for displaying information, a first light source for illuminating said liquid crystal display from behind, a first opening formed in said film pressure plate, and a first optical system for recording said information displayed in said liquid crystal display, said information being recorded as said first data from behind said film through said first opening;

said second data recording means including a second opening formed in said film pressure plate, and a second optical system for recording said information displayed in said liquid crystal display, said information being recorded as said second data from behind said film through said second opening;

said first optical system including a convex lens on which light that passes through said liquid crystal display impinges, a concave lens on which light that passes through said convex lens impinges, and a first reflecting surface for reflecting light that passes through said concave lens to direct said light to said first opening;

said second optical system including a second reflecting surface for reflecting said light that passes through said convex lens to direct said light to said second opening; and said selector means inserts said second reflecting surface into an optical axis of said convex lens when said second size is designated.

2. A camera as defined in claim 1, wherein:

said selector means supports said concave lens and said second reflecting surface; and when said second reflecting surface is inserted in said optical axis of said convex lens, said concave lens retreats from said optical axis of said convex lens, and when said concave lens is inserted in said optical axis of said convex lens, said second reflecting surface retreats from said optical axis of said convex lens.

3. A camera comprising:

size designating means for designating one of at least first and second picture sizes in order to determine before effecting exposure a picture size to be printed photographically, said second size being smaller than said first size, in which a first area is used for photographic printing in accordance with a picture as formed on photographic film upon designating said first size, and a second area is used for photographic printing at a larger printing magnification in accordance with a picture as formed on said film upon designating said second size;

first data recording means for recording first data within said first area;

second data recording means for recording second data within said second area, said second data being smaller than said first data; and selector means for selecting one of said first and second data recording means in accordance with designation of said sizes by said size designating means;

said first data recording means including a liquid crystal display for displaying information, a first light source for illuminating said liquid crystal display from behind, a first opening formed in said film pressure plate, and a first optical system for recording said information displayed in said liquid crystal display, said information being recorded as said first data from behind said film through said first opening;

said second data recording means including a second opening formed in said film pressure plate, and a second optical system for recording said information displayed in said liquid crystal display, said information being recorded as said second data from behind said film through said second opening;

said first optical system including a first convex lens and a first reflecting surface for reflecting light that passes through said first convex lens to direct said light to said first opening;

said second optical system including a second convex lens having a focal length shorter than said first convex lens, and a second reflecting surface for reflecting light that passes through said second convex lens to direct said light to said second opening;

said selector means supporting said first and second convex lenses and said second reflecting surface; and when said first size is designated, said first convex lens is inserted in an optical path of said liquid crystal display, and when said second size is designated, said second convex lens and said second reflecting surface are inserted in said optical path of said liquid crystal display.

4. A camera in which the size of the picture is changeable, including an exposure aperture for forming on photographic film a first picture having a full size, masking means for partially masking said exposure aperture to form on said film a second picture having a size smaller than said first picture, and operable means for moving said masking means between a masking position wherein said masking means masks said exposure aperture partly and a retracted position wherein said masking means is retracted from said exposure aperture, said camera comprising:

a liquid crystal display for displaying data;

a light source for illuminating said liquid crystal display from behind;

a first optical system for projecting said data of said liquid crystal display onto a first position within said first picture;

a second optical system for projecting said data of said liquid crystal display onto a second position within said second picture and in a smaller size than the first-mentioned data;

selector means for introducing light that has passed through said liquid crystal display selectively into either of said first and second optical systems in response to operation of said operable means;

a film pressure plate for pressing said film against said exposure aperture, and first and second openings formed in said film pressure plate for passing therethrough respective light from said first and second optical systems toward said film;

said liquid crystal display, said first and second optical systems and said selector means being disposed behind said film pressure plate;

said first optical system including a first convex lens and a first reflecting surface for reflecting light passing through said first convex lens to direct said light to said first opening;

said second optical system including a second convex lens having a focal length shorter than said first convex lens, and a second reflecting surface for reflecting light passing through said second convex lens to direct said light to said second opening;

said selector means supporting said first and second convex lenses and said second reflecting surface; and when said first size is designated, said first convex lens is inserted in an optical path of said liquid crystal display, and when said second size is designated, said second convex lens and said second reflecting surface are inserted in said optical path of said liquid crystal display.

5. A camera in which the size of the picture is changeable, including an exposure aperture for forming on photographic film a first picture having a full size, masking means for partially masking said exposure aperture to form on said film a second picture having a size smaller than said first picture, and operable means for moving said masking means between a masking position wherein said masking means masks said exposure aperture partly and a retracted position wherein said masking means is retracted from said exposure aperture, said camera comprising:

a liquid crystal display for displaying data;

a light source for illuminating said liquid crystal display from behind;

a first optical system for projecting said data of said liquid crystal display onto a first position within said first picture;

a second optical system for projecting said data of said liquid crystal display onto a second position within said second picture and in a smaller size than the first-mentioned data;

selector means for introducing light that has passed through said liquid crystal display selectively into either of said first and second optical systems in response to operation of said operable means;

a film pressure plate for pressing said film against said exposure aperture, and first and second openings formed in said film pressure plate for passing therethrough respective light from said first and second optical systems toward said film;

said liquid crystal display, said first and second optical systems and said selector means being disposed behind said film pressure plate;

said first optical system including a convex lens on which light passing through said liquid crystal display is incident, a concave lens on which light passing through said convex lens is incident, and a first reflecting surface for reflecting light passing through said concave lens to direct the last-named light to said first opening;

said second optical system including a second reflecting surface for reflecting said light passing through said convex lens to direct said light to said second opening; and said selector means inserting said second reflecting surface into an optical axis of said convex lens when said second size is designated.

6. A camera as defined in claim 5, wherein:

said selector means supports said concave lens and said second reflecting surface; and when said second reflecting surface is inserted in said optical axis of said convex lens, said concave lens is retracted from said optical axis of said convex lens, and when said concave lens is inserted in said optical axis of said convex lens, said second reflecting surface is retracted from said optical axis of said convex lens.

7. A camera as defined in claim 6, wherein said selector means is swung between conditions of said second reflecting surface of insertion in, and retraction from, said optical axis.

8. A camera as defined in claim 6, wherein said selector means slides between conditions of said second reflecting surface of insertion in, and retraction from, said optical axis.

9. A camera of which the size of a picture is changeable, including an exposure aperture for forming on photographic film a first picture having a full size, masking means for partially masking said exposure aperture in order to form on said film a second picture having a size smaller than said first picture, means for moving said masking means between a masking position wherein said masking means partially masks said exposure aperture and a retracted position wherein said masking means is retracted from said exposure aperture, first data recording means for recording first data on said film, second data recording means for recording second data on said film, a light source for supplying light to said first and second data recording means, a mirror movable between two positions in one of which positions said mirror directs light from said light source toward one of said data recording means and in a second of which positions said mirror is retracted from the path of said light thereby to permit light from said light source to fall on the other of said recording means, and means responsive to said two positions of said mirror selectively to actuate either of said recording means.

* * * * *